(12) United States Patent
Anderson et al.

(10) Patent No.: US 8,201,167 B2
(45) Date of Patent: Jun. 12, 2012

(54) ON-DEMAND ALLOCATION OF VIRTUAL ASYNCHRONOUS SERVICES INTERFACES

(75) Inventors: Gary D. Anderson, Austin, TX (US);
Shamsundar Ashok, Austin, TX (US);
Carol B. Hernandez, Austin, TX (US);
Christopher Mcnelis, Austin, TX (US);
Priya Paul, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 882 days.

(21) Appl. No.: 12/269,097

(22) Filed: Nov. 12, 2008

(65) Prior Publication Data

US 2010/0122249 A1   May 13, 2010

(51) Int. Cl.
*G06F 9/455* (2006.01)
*G06F 9/46* (2006.01)

(52) U.S. Cl. .......................................... 718/1

(58) Field of Classification Search ................ None
See application file for complete search history.

(56) References Cited

U.S. PATENT DOCUMENTS

| | | |
|---|---|---|
| 6,690,678 B1 | 2/2004 | Basso et al. |
| 7,080,378 B1 | 7/2006 | Noland et al. |
| 7,398,337 B2 | 7/2008 | Arndt et al. |
| 7,421,533 B2 | 9/2008 | Zimmer et al. |
| 2009/0307687 A1* | 12/2009 | Nevarez et al. .................. 718/1 |
| 2009/0307688 A1* | 12/2009 | Pafumi et al. ..................... 718/1 |

* cited by examiner

*Primary Examiner* — Corey S Faherty
(74) *Attorney, Agent, or Firm* — Francis Lammes; Stephen J. Walder, Jr.; Libby Z. Toub (57) ABSTRACT

An on-demand allocation of virtual asynchronous services interface adapters is provided. A determination is made as to whether an operation request requires that a set of virtual I/O service partitions have a required number of virtual asynchronous services interface adapters. If a required number of virtual asynchronous services interface adapters is required, a determination is made as to whether the set of virtual I/O service partitions have the required number of virtual asynchronous services interface adapters. Responsive to a failure to have the required number of virtual asynchronous services interface adapters, a set of new virtual asynchronous services interface adapters is defined in partition management firmware and in the set of virtual I/O service partitions. The set of new virtual asynchronous services interface adapters is configured in the set of virtual I/O service partitions and the operation is issued to the set of virtual I/O service partitions.

20 Claims, 4 Drawing Sheets

ON-DEMAND ALLOCATION OF VIRTUAL ASYNCHRONOUS SERVICES INTERFACES

BACKGROUND OF THE INVENTION

1. Field of the Invention

The present application relates generally to an improved data processing system and method. More specifically, the present application is directed to an on-demand allocation of virtual asynchronous services interfaces.

2. Background of the Invention

Virtualization of computing resources is important in current computer environments. International Business Machine's POWER™ hypervisor, which is part of the firmware in Power™ systems, allows the virtualization of physical processors, memory, and I/O devices. Hypervisor is a virtual manager that partitions a system into multiple virtual machines and manages the system's resources across the virtual machines. These partitions can use whole physical processors or a fractional part of a whole physical processor. Each partition is assigned virtual processors that get mapped to a whole or a fractional part of physical processors by the hypervisor.

Within a virtualized server environment, certain virtual Input/Output (I/O) functions may be provided via a special service logical partition (LPAR) commonly referred to as a Virtual I/O Server (VIOS). In order to provide these functions, the VIOS may need to be able to communicate with the partition management firmware, e.g. a hypervisor. A Virtual Asynchronous Services Interface (VASI) is one example of an interface that provides a communication channel for the VIOS to communicate with the partition management firmware. For example, a VIOS can provide a Mover Service Partition (MSP) service to extract, migrate, and install the partition state of other LPARs on the same server to another (destination) server. The MSP may obtain these partition states from the partition management firmware using a VASI device.

VASI adapters, like all virtual device types, require memory overhead by the partition management firmware. Memory is a constrained resource and, hence, it is beneficial to limit this overhead. Therefore, always having VASI adapters allocated to a VIOS in a virtualized server environment may be wasteful, especially if that VIOS is never intended to provide services requiring a VASI adapter. Since LPARs cannot allocate hardware resources to themselves, the LPARs operate in isolation in that they are unaware of those server resources outside those that are assigned to them. Furthermore, the partition management firmware is not capable of allocating VASIs itself as the partition management firmware would then face a "chicken-or-egg" scenario where to notify the VIOS that the partition management firmware has allocated a VASI adapter, the partition management firmware would need a VASI adapter to do so.

BRIEF SUMMARY OF THE INVENTION

In one illustrative embodiment, a method, in a data processing system, is provided for an on-demand allocation of virtual asynchronous services interface adapters. The illustrative embodiment determines if an operation request requires that a set of virtual I/O service partitions have a required number of virtual asynchronous services interface adapters. The illustrative embodiment determines if the set of virtual I/O service partitions have the required number of virtual asynchronous services interface adapters in response to the operation request requiring that the set of virtual I/O service partitions have a required number of virtual asynchronous services interface adapters. The illustrative embodiment defines a set of new virtual asynchronous services interface adapters in partition management firmware and in the set of virtual I/O service partitions in response to the set of virtual I/O service partitions failing to have the required number of virtual asynchronous services interface adapters. The illustrative embodiment configures the set of new virtual asynchronous services interface adapters in the set of virtual I/O service partitions. The illustrative embodiment issues the operation to the set of virtual I/O service partitions. In the illustrative embodiments, the set of virtual I/O service partitions communicate with the partition management firmware via the set of new virtual asynchronous services interface adapters.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE INVENTION

The illustrative embodiments provide a mechanism for an on-demand allocation scheme that allocates Virtual Asynchronous Services Interface (VASI) adapters to one or more Virtual I/O Servers (VIOSs) once a confirmation is made that a special service is to be invoked. The illustrative embodiments provide a platform management endpoint that has a global view of the virtualized environment. Acting as an orchestrator of virtualization lifecycle events, the platform management endpoint typically directs VIOSs to provide specific services that require VASI adapters. Therefore, the platform management endpoint is the entity that decides to allocate VASI adapters on-demand. By following an on-demand approach, situations where one or more VASI adapters are unnecessarily assigned to a VIOS may be avoided. Using an on-demand approach allows more efficient overall memory use. The platform management endpoint does not need the VASI adapter for its own operation, but since the platform management endpoint has communication with both the VIOS and partition management firmware, the platform management endpoint may then allocate the VASI adapter and simultaneously notify both the VIOS and partition management firmware to begin using the VASI adapter.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
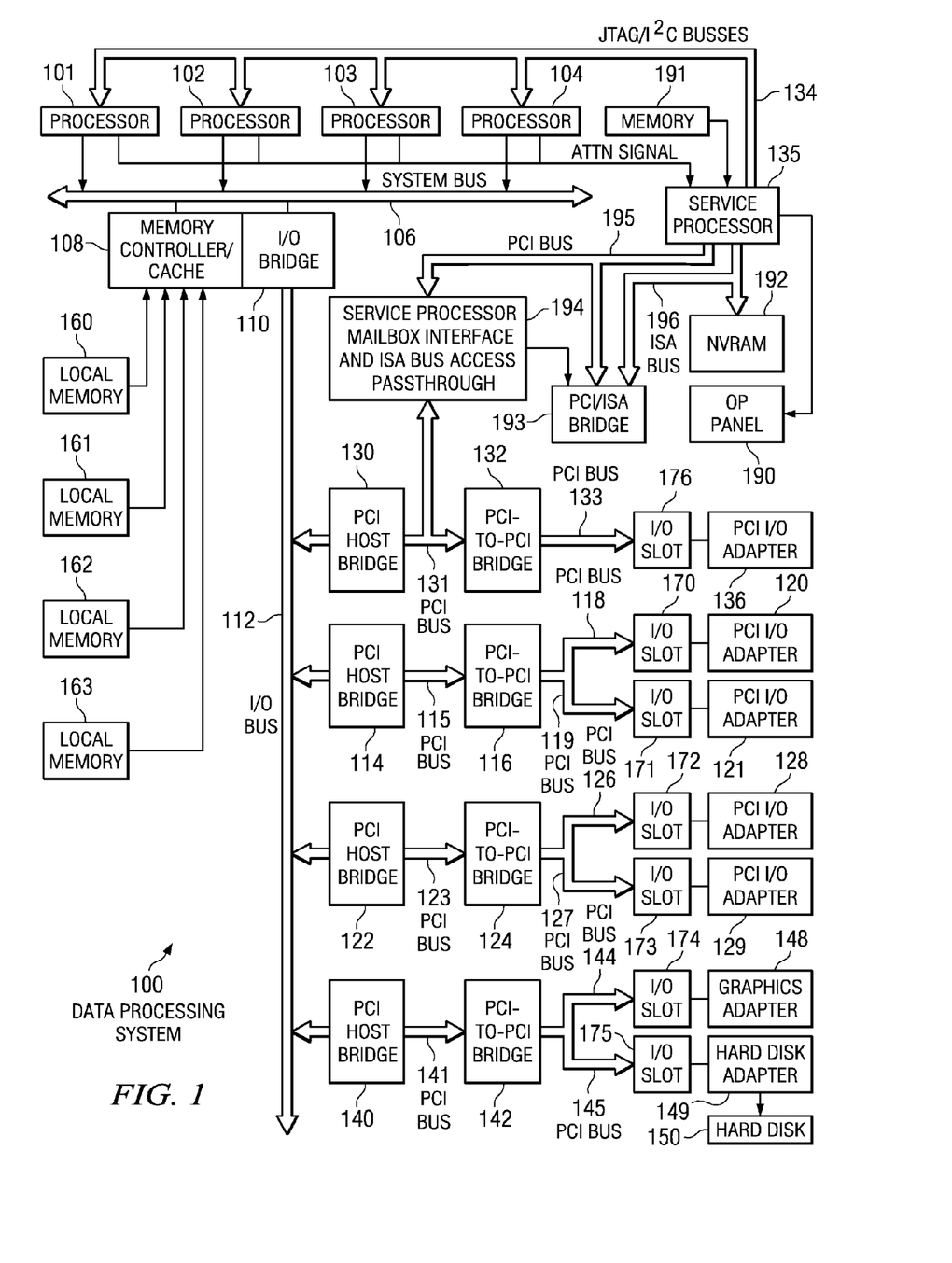
FIG. 1 depicts an exemplary block diagram of a data processing system in which the illustrative embodiments may be implemented.
Figure 2:
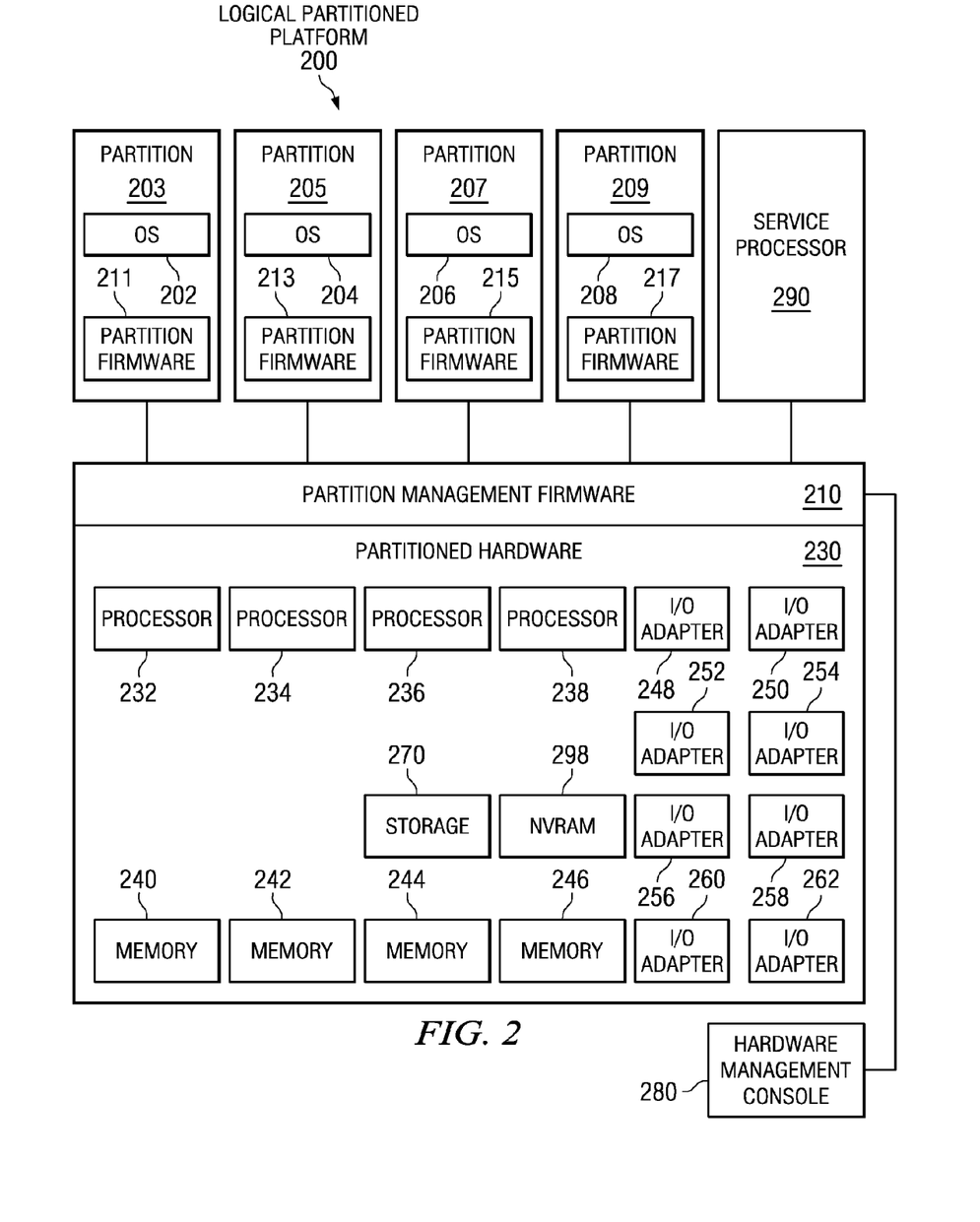
FIG. 2 depicts a block diagram of an exemplary logically partitioned platform in which the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of an on-demand allocation mechanism of Virtual Asynchronous Services Interface (VASI) adapters, this is only an example and is not intended to state or imply any limitation with regard to the features of the present invention. To the contrary, the illustrative embodiments are intended to include distributed data processing environments and embodiments in which Virtual Asynchronous Services Interface (VASI) adapters may be allocated on-demand to Virtual I/O Servers (VIOSs) once a confirmation is made that a special service logical partition (LPAR) is to be invoked.

With reference now to the figures, FIG. 1 depicts an exemplary block diagram of a data processing system in which the illustrative embodiments may be implemented. Data processing system 100 may be a symmetric multiprocessor (SMP) system, or a heterogeneous multiprocessor system, including a plurality of processors 101, 102, 103, and 104 connected to system bus 106. For example, data processing system 100 may be an IBM® eServer™, a product of International Business Machines Corporation of Armonk, N.Y., implemented as a server within a network. Moreover, data processing system 100 may be a Cell Broadband Engine (CBE) data processing system, another product of International Business Machines Corporation. Alternatively, a single processor system may be employed.

Also connected to system bus 106 is memory controller/cache 108, which provides an interface to a plurality of local memories 160-163. Input/Output (I/O) bus bridge 110 is connected to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149, or individual functions of any of the above adapters, may be assigned to different logical partitions (LPARs). In this case, graphics adapter 148 provides a connection for a display device (not shown), while hard disk adapter 149 provides a connection to control hard disk 150.

Thus, for example, assume data processing system 100 is divided into three logical partitions, P1, P2, and P3. Each of PCI I/O adapters 120-121, 128-129, 136, graphics adapter 148, hard disk adapter 149, or individual functions of any of the above adapters, each of host processors 101-104, and memory from local memories 160-163 are assigned to the three partitions.

In these examples, local memories 160-163 may take the form of dual in-line memory modules (DIMMs). The DIMMs are not normally assigned on a per DIMM basis to the partitions but rather, a partition will be assigned a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are assigned to its logical partition. For example, one instance of the Advanced Interactive Executive (AIX®) operating system may be executing within partition P1, a second instance (image) of the AIX® operating system may be executing within partition P2, and a Linux® or OS/400 operating system may be operating within logical partition P3.

Peripheral component interconnect (PCI) host bridge 114, connected to I/O bus 112, provides an interface to PCI bus 115. A number of PCI input/output adapters 120-121 may be connected to PCI bus 115 through PCI-to-PCI bridge 116, the PCI bus 118, the PCI bus 119, the I/O slot 170, and the I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120-121 provides an interface between data processing system 100 and input/output devices.

An additional PCI host bridge 122 connected to I/O bus 112 provides an interface for an additional PCI bus 123. PCI bus 123 is connected to a plurality of PCI I/O adapters 128-129. PCI I/O adapters 128-129 may be connected to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128 and 129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141, and PCI host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

PCI host bridge 130 provides an interface for PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus 131 also connects PCI host bridge 130 to service processor mailbox interface and ISA bus access passthrough logic 194. Service processor mailbox interface and ISA bus access passthrough logic 194 forwards PCI accesses destined to PCI/ISA bridge 193. Non-volatile RAM (NVRAM) storage 192 is connected to ISA bus 196.

Service processor 135 is coupled to service processor mailbox interface and ISA bus access passthrough logic 194 through its local PCI bus 195. Service processor 135 is also connected to processors 101-104 via a plurality of JTAG/I²C busses 134. JTAG/I²C busses 134 are a combination of JTAG/scan busses (see IEEE 1149.1) and Phillips I²C busses. However, alternatively, JTAG/I²C busses 134 may be replaced by only Phillips I²C busses or only JTAG/scan busses. All SP-ATTN signals of host processors 101, 102, 103, and 104 are connected together to an interrupt input signal of the service processor 135. Service processor 135 has its own local memory 191 and has access to hardware OP-panel 190.

When data processing system 100 is initially powered up, service processor 135 uses JTAG/I²C busses 134 to interrogate the system (host) processors 101-104, memory controller/cache 108, and I/O bridge 110. At completion of this step, service processor 135 has an inventory and topology understanding of the data processing system 100. Service processor 135 also executes Built-In-Self-Tests (BISTs), Basic Assurance Tests (BATs), and memory tests on all elements found by interrogating host processors 101-104, memory controller/cache 108, and I/O bridge 110. Any error information for failures detected during the BISTs, BATs, and memory tests are gathered and reported by the service processor 135.

If a valid configuration of system resources is still possible after taking out the elements found to be faulty during the BISTs, BATs, and memory tests, then data processing system 100 is allowed to proceed to load executable code into the local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, the I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for de-configuration during the current running session and future Initial Program Loads (IPLs).

Data processing system 100 may be implemented using various commercially available computer systems. For example, data processing system 100 may be implemented using IBM® eServer™ iSeries® Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the illustrative embodiments set forth hereafter but is only meant to provide one example of a data processing system in which the exemplary aspects of the illustrative embodiments may be implemented.

With reference now to FIG. 2, a block diagram of an exemplary logically partitioned platform is depicted in which the illustrative embodiments may be implemented. The hardware in the logically partitioned platform 200 may be implemented, for example, using the hardware of the data processing system 100 in FIG. 1.

Logically partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logically partitioned platform 200. These operating systems may be implemented, for example, using OS/400, which is designed to interface with a virtualization mechanism, such as partition management firmware 210, e.g., a hypervisor. OS/400 is used only as an example in these illustrative embodiments. Of course, other types of operating systems, such as AIX® and Linux®, may be used depending on the particular implementation. Operating systems 202, 204, 206, and 208 are located in logical partitions 203, 205, 207, and 209, respectively.

Hypervisor software is an example of software that may be used to implement platform (in this example, partition management) firmware 210 and is available from International Business Machines Corporation. Firmware is "software" stored in a memory chip that holds its content without electrical power, such as, for example, a read-only memory (ROM), a programmable ROM (PROM), an erasable programmable ROM (EPROM), and an electrically erasable programmable ROM (EEPROM).

Logical partitions 203, 205, 207, and 209 also include partition firmware 211, 213, 215, and 217. Partition firmware 211, 213, 215, and 217 may be implemented using IPL or initial boot strap code, IEEE-1275 Standard Open Firmware, and runtime abstraction software (RTAS), which is available from International Business Machines Corporation.

When logical partitions 203, 205, 207, and 209 are instantiated, a copy of the boot strap code is loaded into logical partitions 203, 205, 207, and 209 by partition management firmware 210. Thereafter, control is transferred to the boot strap code with the boot strap code then loading the open firmware and RTAS. The processors associated or assigned to logical partitions 203, 205, 207, and 209 are then dispatched to the logical partition's memory to execute the logical partition firmware.

Partitioned hardware 230 includes a plurality of processors 232-238, a plurality of system memory units 240-246, a plurality of input/output (I/O) adapters 248-262, and storage unit 270. Each of processors 232-238, memory units 240-246, NVRAM storage 298, and I/O adapters 248-262 may be assigned to one of multiple logical partitions 203, 205, 207, and 209 within logically partitioned platform 200, each of which corresponds to one of operating systems 202, 204, 206, and 208.

Partition management firmware 210 performs a number of functions and services for logical partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of the logical partitioned platform 200.

Service processor 290 may be used to provide various services, such as processing of platform errors in logical partitions 203, 205, 207, and 209. Service processor 290 may also act as a service agent to report errors back to a vendor, such as International Business Machines Corporation. Operations of the different logical partitions may be controlled through hardware management console 280. Hardware management console 280 is a separate data processing system from which a system administrator may perform various functions including reallocation of resources to different logical partitions.

As discussed above, logical partitions (LPARs) cannot allocate hardware resources to themselves. LPARs operate in isolation, thus, LPARs are unaware of those server resources outside those that are assigned. Furthermore, partition management firmware is not able to allocate Virtual Asynchronous Services Interface (VASI) adapters as the partition management firmware would face a "chicken-or-egg" scenario where to notify the Virtual I/O Server (VIOS) that the partition management firmware has allocated a VASI adapter. That is, the partition management firmware would need a VASI adapter to do so. Thus, the illustrative embodiments provide a mechanism for an on-demand allocation scheme that allocates VASI adapters to VIOSs once a confirmation is made that a special service LPAR is to be invoked.

Figure 3:
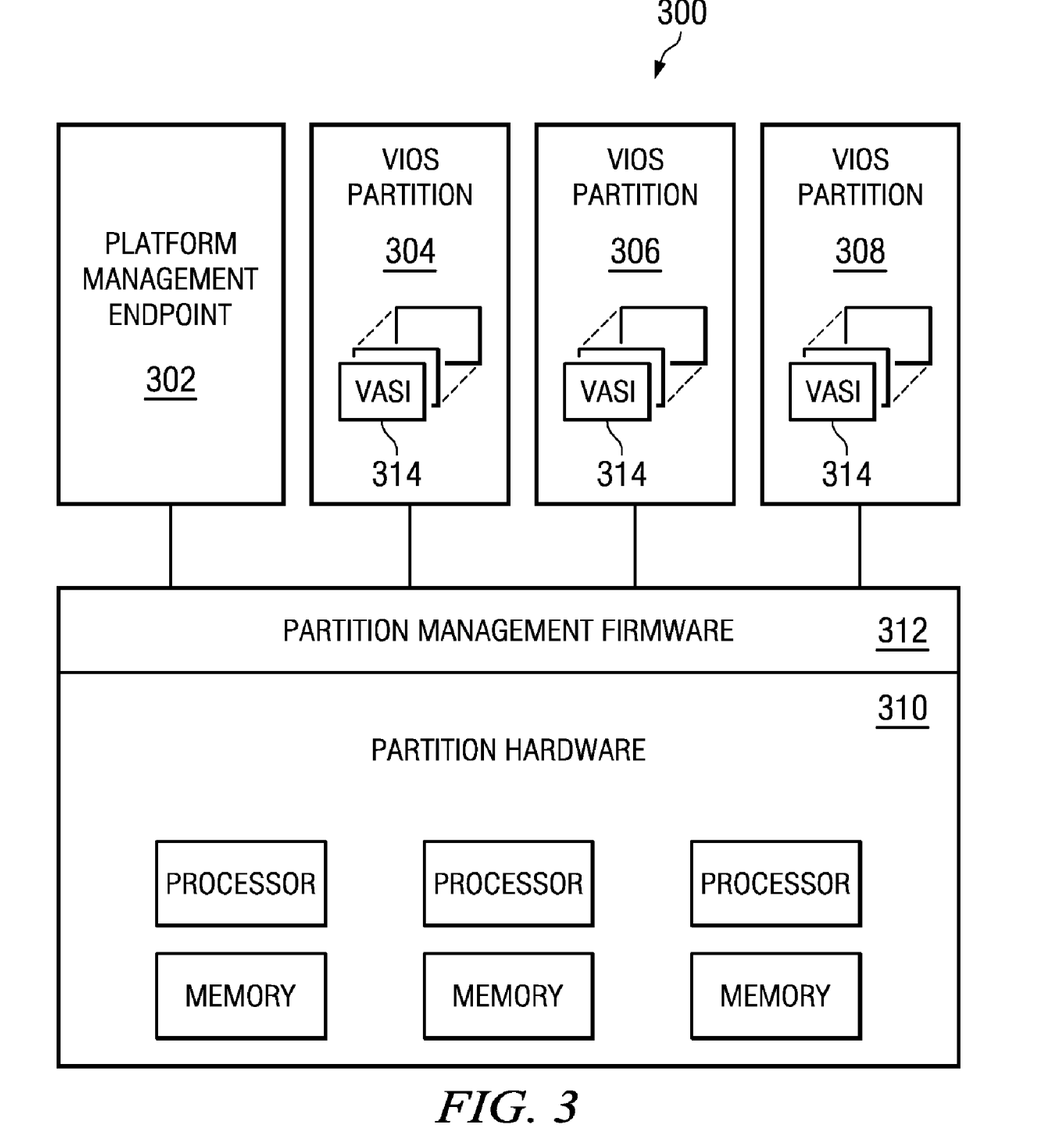
FIG. 3 depicts an exemplary illustration of an on-demand Virtual Asynchronous Services Interface (VASI) adapter allocation mechanism in accordance with an illustrative embodiment.

FIG. 3 depicts an exemplary illustration of an on-demand Virtual Asynchronous Services Interface (VASI) adapter allocation mechanism in accordance with an illustrative embodiment. In this example, logically partitioned platform 300 may comprise platform management endpoint 302, logical partitions or Virtual I/O Server (VIOS) partitions 304, 306, and 308, partition hardware 310, and partition management firmware 312. Platform management endpoint 302 is the central point of control or system manager of the logically partitioned platform 300. Platform management endpoint 302 coordinates administrator initiation and setup of command sequences that flow between the various partition components. The command sequences may include operations, such as active memory sharing, partition migrations, data extractions, or the like. Platform management endpoint 302 may provide a graphical user interface (GUI) wizard interface and/or a command-line interface. Platform management endpoint 302 interacts with service processors, partition management firmware 312 on source and destination servers, VIOS partitions 304, 306, and 308, as well as other service partition mechanisms that may exist within VIOS partitions 304, 306, and 308.

When an administrator initiates an operation request, platform management endpoint 302 receives the operation request and determines if the operation request requires a VIOS partition that further requires the use of a VASI adapter. When the operation requires that, for example, VIOS partition 304 have one or more VASI adapters, platform management endpoint 302 analyzes VIOS partition 304 to determine if VIOS partition 304 has sufficient VASI adapters allocated. Platform management endpoint 302 may identify VASI adapter allocation by querying VIOS partition 304 for an existence of already established VASI adapters and a load of each of the existing VASI adapters.

Platform management endpoint 302 uses VASI adapter information in the operation request and VASI adapter allocation on VIOS partition 304 to determine whether VIOS partition 304 has sufficient VASI adapters or if more VASI adapters are required. Some requested operations may require a fixed number of VASI adapters, while other requested operations may require a variable number of VASI adapters based on the number of client VIOS partitions which will be using that operation. More VASI adapters would achieve load-balancing in that no single VASI adapter becomes overburdened providing multiple services such that performance degradation is observed.

If platform management endpoint 302 determines that a new VASI adapter is required or more VASI adapters are required, platform management endpoint 302 defines the required one(s) of VASI adapters 314 to partition management firmware 312 and to VIOS partition 304. In defining the required one(s) of VASI adapters 314 to VIOS partition 304, platform management endpoint 302 configures the required one(s) of VASI adapters 314 in VIOS partition 304 by loading the appropriate device driver(s), thus notifying VIOS partition 304 of the existence of the required one(s) of VASI adapters 314. In defining the required one(s) of VASI adapters 314 to partition management firmware 312, partition management firmware 312 is notified of the existence of the required one(s) of VASI adapters 314. In configuring and notifying VIOS partition 304 and partition management firmware 312 of the existence of VASI adapters 314, platform management endpoint 302 identifies not only the VASI adapter(s) that will be used for communication but also one or more communication stream(s) of the VASI adapters on which to communicate. That is, each VASI adapter may have 1 to n number of communication streams with which to communicate to partition management firmware 312 for a particular operation. Thus, platform management endpoint 302 identifies which communication stream or communication streams will be used for the particular operation.

Once VIOS partition 304 and partition management firmware 312 have been notified of the existence of VASI adapter 314, VIOS partition 304 and partition management firmware 312 may engage in communication over VASI adapters 314 to perform the requested operation. After the operation necessitating VASI adapters 314 completes, platform management endpoint 302 may either deallocate VASI adapters 314 in order to conserve memory used by partition management firmware 312, or leave VASI adapters 314 allocated for the duration of the existence of VIOS partition 304 under the assumption that the same operation or a different operation requiring VASI adapters 314 will be used or issued in the future. Platform management endpoint 302 may determine the need for VASI adapter 314 to remain allocated by monitoring the number of communication streams that are being used by each individual VASI adapter in VASI adapters 314, the communication streams used by all of VASI adapters, some combination of individual communication streams versus all the communication streams, or the like.

Thus, the illustrative embodiments provide a platform management endpoint that has a global view of the virtualized environment. Acting as an orchestrator of virtualization lifecycle events, the platform management endpoint typically directs VIOSs to provide specific services that require VASI adapters. Therefore, the platform management endpoint is the entity that decides to allocate and deallocate VASI adapters on-demand.

Figure 4:
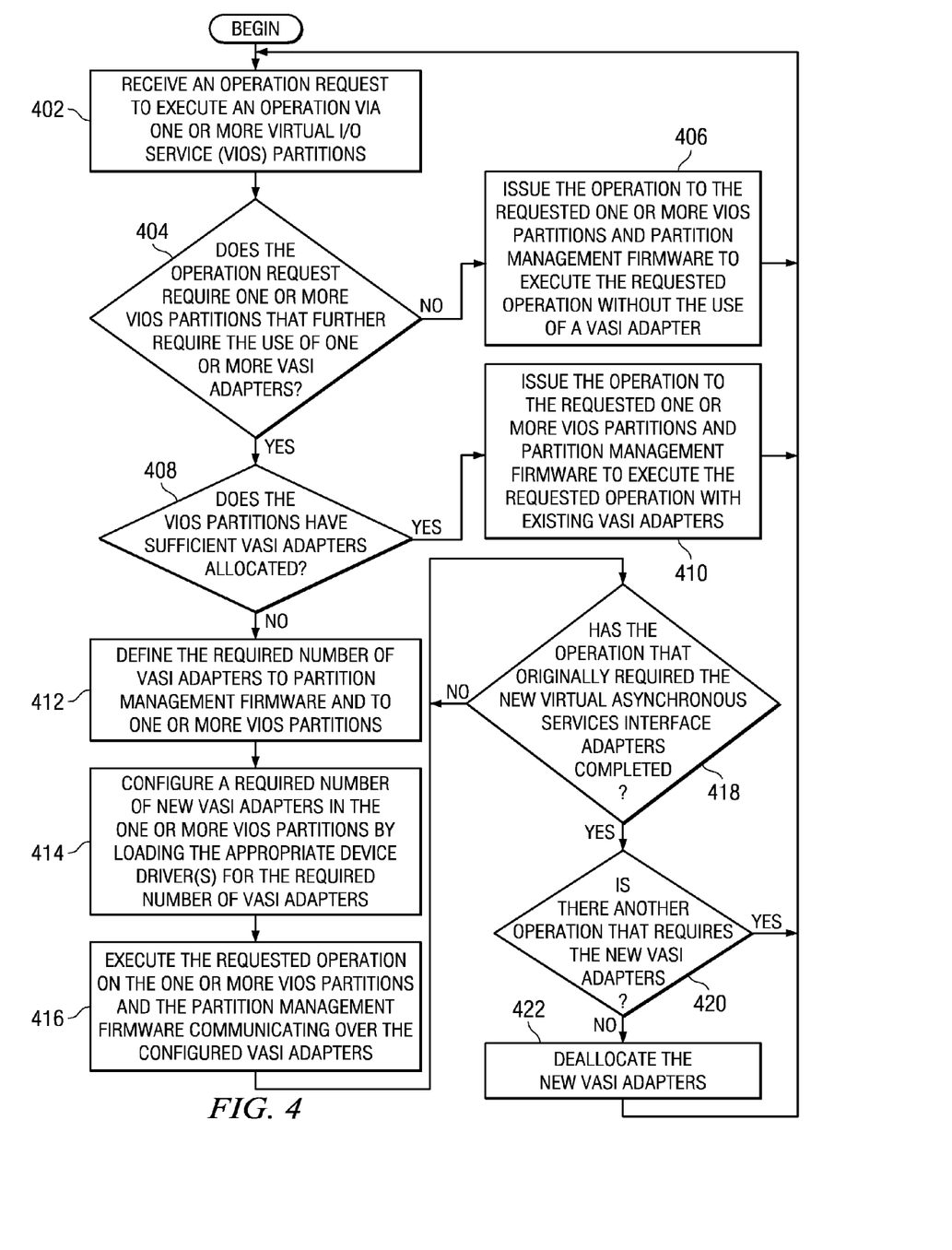
FIG. 4 illustrates an exemplary operation of a mechanism for on-demand allocation of Virtual Asynchronous Services Interface (VASI) adapters in accordance with an illustrative embodiment.

FIG. 4 illustrates an exemplary operation of a mechanism for on-demand allocation of Virtual Asynchronous Services Interface (VASI) adapters in accordance with an illustrative embodiment. As the operation begins, a platform management endpoint receives an operation request from an administrator or user to execute an operation via one or more Virtual I/O Service (VIOS) partitions (step 402). The platform management endpoint determines if the operation request requires one or more VIOS partitions that further require the use of one or more VASI adapters (step 404). If at step 404 the platform management endpoint determines that the operation request does not require one or more VIOS partitions that further require the use of one or more VASI adapters, then the platform management endpoint issues the operation to the requested one or more VIOS partitions and partition management firmware to execute the requested operation without the use of a VASI adapter (step 406), with the operation returning to step 402 thereafter for a next operation.

If at step 404 the platform management endpoint determines that the operation request requires one or more VIOS partitions that further require the use of one or more VASI adapters, the platform management endpoint analyzes the requested one or more VIOS partitions to determine if the VIOS partitions have sufficient VASI adapters allocated (step 408). If at step 408 the platform management endpoint determines that the one or more VIOS partitions have the requested number of VASI adapters, then the platform management endpoint issues the operation to the requested one or more VIOS partitions and partition management firmware to execute the requested operation with existing VASI adapters (step 410), with the operation returning to step 402 thereafter for a next operation.

If at step 408 the platform management endpoint determines that the one or more VIOS partitions fail to have the requested number of VASI adapters, the platform management endpoint defines a required number of VASI adapters to partition management firmware and the one or more VIOS partitions (step 412). The platform management endpoint then configures the required number of new VASI adapters in the one or more VIOS partitions and the partition management firmware by loading the appropriate device driver(s) for the required number of VASI adapters (step 414).

Once the one or more VIOS partitions and the partition management firmware have been notified of the existence of the new VASI adapters, the one or more VIOS partitions and the partition management firmware may engage in communication over the configured VASI adapters to execute the requested operation (step 416). After the operation is initiated between the one or more VIOS partitions and the partition management firmware, the platform management endpoint determines if the operation that originally required the new virtual asynchronous services interface adapters has completed (step 418). If at step 418 the operation has failed to complete, then the operation returns to step 418. If at step 418 the operation completes, then the platform management endpoint determines if there is another operation that requires the new VASI adapters (step 420). If at step 420 there is another operation requiring the new VASI adapters, then the operation proceeds to step 402. If at step 420 there is not another operation requiring the new VASI adapters, then the platform management firmware deallocates the new VASI adapters (step 422), with the operation returning to step 402 thereafter for a next operation.

Thus, the illustrative embodiments provide for an on-demand allocation scheme that allocates Virtual Asynchronous Services Interface (VASIs) adapter to Virtual I/O Servers (VIOSs) once a confirmation is made that a special service logical partition (LPAR) is to be invoked. The illustrative embodiments provide a platform management endpoint that has a global view of the virtualized environment. Acting as an orchestrator of virtualization lifecycle events, the platform management endpoint typically directs VIOSs to provide specific services that require VASI adapters. Therefore, the platform management endpoint is the entity that decides to allocate VASI adapters on-demand. By following an on-demand approach, situations where one or more VASI adapters are unnecessarily assigned to a VIOS may be avoided. Using an on-demand approach allows more efficient overall memory use. The platform management endpoint does not need the VASI adapter for its own operation, but since the platform management endpoint has communication with both the VIOS and partition management firmware, the platform management endpoint may then allocate the VASI adapter and simultaneously notify both the VIOS and partition management firmware to begin using the VASI adapter As noted above, it should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for an on-demand allocation of virtual asynchronous services interface adapters, the method comprising:

determining if an operation request requires that a set of virtual I/O service partitions have a required number of virtual asynchronous services interface adapters;

responsive to the operation request requiring that the set of virtual I/O service partitions have a required number of virtual asynchronous services interface adapters, determining if the set of virtual I/O service partitions have the required number of virtual asynchronous services interface adapters;

responsive to the set of virtual I/O service partitions failing to have the required number of virtual asynchronous services interface adapters, defining a set of new virtual asynchronous services interface adapters in partition management firmware and in the set of virtual I/O service partitions;

configuring the set of new virtual asynchronous services interface adapters in the set of virtual I/O service partitions; and issuing the operation to the set of virtual I/O service partitions, wherein the set of virtual I/O service partitions communicate with the partition management firmware via the set of new virtual asynchronous services interface adapters.

2. The method of claim 1, further comprising:

executing an operation associated with the operation request on the set of virtual I/O service partitions using the set of new virtual asynchronous services interface adapters.

3. The method of claim 2, further comprising:

determining if the operation that originally required the new virtual asynchronous services interface adapters has completed execution;

responsive to the operation completing execution, determining if another operation exists that requires the new virtual asynchronous services interface adapters; and responsive to another operation failing to require the new virtual asynchronous services interface adapters, deallocating the new virtual asynchronous services interface adapters.

4. The method of claim 1, wherein configuring the set of virtual asynchronous services interface adapters in the set of virtual I/O service partitions comprises:
loading one or more device drivers for the set of virtual asynchronous services interface adapters.

5. The method of claim 1, further comprising;
responsive to the operation request failing to require that the set of virtual I/O service partitions have a required number of virtual asynchronous services interface adapters, issuing the operation request to the set of virtual I/O service partitions; and
executing an operation associated with the operation request on the set of virtual I/O service partitions without the use of virtual asynchronous services interface adapters.

6. The method of claim 1, further comprising:
responsive to the set of virtual I/O service partitions having the required number of virtual asynchronous services interface adapters, issuing the operation to the set of virtual I/O service partitions; and
executing an operation associated with the operation request with existing virtual asynchronous services interface adapters.

7. The method of claim 1, wherein defining the set of new virtual asynchronous services interface adapters in partition management firmware and in the set of virtual I/O service partitions is performed by a platform management endpoint that is coupled directly to the partition management firmware and the set of virtual I/O service partitions.

8. The method of claim 1, wherein each virtual asynchronous services interface adapter in the set of new virtual asynchronous services interface adapters communicates with partition management firmware using a set of communication streams and wherein the set of communication streams are configured by a platform management endpoint.

9. A computer program product comprising a non-transitory computer-readable medium having a computer readable program recorded thereon, wherein the computer readable program, when executed on a computing device, causes the computing device to:
determine if an operation request requires that a set of virtual I/O service partitions have a required number of virtual asynchronous services interface adapters;
responsive to the operation request requiring that the set of virtual I/O service partitions have a required number of virtual asynchronous services interface adapters, determine if the set of virtual I/O service partitions have the required number of virtual asynchronous services interface adapters;
responsive to the set of virtual I/O service partitions failing to have the required number of virtual asynchronous services interface adapters, define a set of new virtual asynchronous services interface adapters in partition management firmware and in the set of virtual I/O service partitions;
configure the set of new virtual asynchronous services interface adapters in the set of virtual I/O service partitions; and
issue the operation to the set of virtual I/O service partitions, wherein the set of virtual I/O service partitions communicate with the partition management firmware via the set of new virtual asynchronous services interface adapters.

10. The computer program product of claim 9, wherein the computer readable program further causes the computing device to:
execute an operation associated with the operation request on the set of virtual I/O service partitions using the set of new virtual asynchronous services interface adapters.

11. The computer program product of claim 10, wherein the computer readable program further causes the computing device to:
determine if the operation that originally required the new virtual asynchronous services interface adapters has completed execution;
responsive to the operation completing execution, determine if another operation exists that requires the new virtual asynchronous services interface adapters; and
responsive to another operation failing to require the new virtual asynchronous services interface adapters, deallocate the new virtual asynchronous services interface adapters.

12. The computer program product of claim 9, wherein the computer readable program to configure the set of virtual asynchronous services interface adapters in the set of virtual I/O service partitions further causes the computing device to:
load one or more device drivers for the set of virtual asynchronous services interface adapters.

13. The computer program product of claim 9, wherein the computer readable program further causes the computing device to:
responsive to the operation request failing to require that the set of virtual I/O service partitions have a required number of virtual asynchronous services interface adapters, issue the operation request to the set of virtual I/O service partitions; and
execute an operation associated with the operation request on the set of virtual I/O service partitions without the use of virtual asynchronous services interface adapters.

14. The computer program product of claim 9, wherein the computer readable program further causes the computing device to:
responsive to the set of virtual I/O service partitions having the required number of virtual asynchronous services interface adapters, issue the operation to the set of virtual I/O service partitions; and
execute an operation associated with the operation request with existing virtual asynchronous services interface adapters.

15. An apparatus, comprising:
a processor; and
a memory coupled to the processor, wherein the memory comprises instructions which, when executed by the processor, cause the processor to:
determine if an operation request requires that a set of virtual I/O service partitions have a required number of virtual asynchronous services interface adapters;
responsive to the operation request requiring that the set of virtual I/O service partitions have a required number of virtual asynchronous services interface adapters, determine if the set of virtual I/O service partitions have the required number of virtual asynchronous services interface adapters;
responsive to the set of virtual I/O service partitions failing to have the required number of virtual asynchronous services interface adapters, define a set of new virtual asynchronous services interface adapters in partition management firmware and in the set of virtual I/O service partitions;

configure the set of new virtual asynchronous services interface adapters in the set of virtual I/O service partitions; and issue the operation to the set of virtual I/O service partitions, wherein the set of virtual I/O service partitions communicate with the partition management firmware via the set of new virtual asynchronous services interface adapters.

16. The apparatus of claim 15, wherein the instructions further cause the processor to:

execute an operation associated with the operation request on the set of virtual I/O service partitions using the set of new virtual asynchronous services interface adapters.

17. The apparatus of claim 16, wherein the instructions further cause the processor to:

determine if the operation that originally required the new virtual asynchronous services interface adapters has completed execution;

responsive to the operation completing execution, determine if another operation exists that requires the new virtual asynchronous services interface adapters; and responsive to another operation failing to require the new virtual asynchronous services interface adapters, deallocate the new virtual asynchronous services interface adapters.

18. The apparatus of claim 15, wherein the instructions to configure the set of virtual asynchronous services interface adapters in the set of virtual I/O service partitions further cause the processor to:

load one or more device drivers for the set of virtual asynchronous services interface adapters.

19. The apparatus of claim 15, wherein the instructions further cause the processor to:

responsive to the operation request failing to require that the set of virtual I/O service partitions have a required number of virtual asynchronous services interface adapters, issue the operation request to the set of virtual I/O service partitions; and execute an operation associated with the operation request on the set of virtual I/O service partitions without the use of virtual asynchronous services interface adapters.

20. The apparatus of claim 15, wherein the instructions further cause the processor to:

responsive to the set of virtual I/O service partitions having the required number of virtual asynchronous services interface adapters, issue the operation to the set of virtual I/O service partitions; and execute an operation associated with the operation request with existing virtual asynchronous services interface adapters.

* * * * *